United States Patent
Amberg et al.

(10) Patent No.: US 9,248,571 B2
(45) Date of Patent: Feb. 2, 2016

(54) METHOD FOR OPERATING A MULTI-AXIS ROBOT

(75) Inventors: Jessica Amberg, Bubenreuth (DE); Hayo Knoop, Forchheim (DE); Kerstin Sonntag, Fürth (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 880 days.

(21) Appl. No.: 13/029,244

(22) Filed: Feb. 17, 2011

(65) Prior Publication Data
US 2011/0202176 A1    Aug. 18, 2011

(30) Foreign Application Priority Data

Feb. 17, 2010   (DE) .......................... 10 2010 008 240

(51) Int. Cl.
*B25J 9/00*       (2006.01)
*B25J 9/16*       (2006.01)

(52) U.S. Cl.
CPC ..... *B25J 9/1664* (2013.01); *G05B 2219/40317* (2013.01)

(58) Field of Classification Search
CPC ......... G06F 17/50; G06F 19/00; G05D 11/00; B25J 9/06
USPC .................................. 700/245, 250, 255, 247
See application file for complete search history.

(56) References Cited

U.S. PATENT DOCUMENTS

| | | | | |
|---|---|---|---|---|
| 5,103,403 A | * | 4/1992 | Ch'Hayder et al. | 700/263 |
| 5,499,320 A | * | 3/1996 | Backes et al. | 700/260 |
| 6,278,253 B1 | * | 8/2001 | Hong | 318/568.13 |
| 2007/0244599 A1 | | 10/2007 | Tsai et al. | |
| 2007/0278980 A1 | * | 12/2007 | Wilson | 318/573 |
| 2008/0243307 A1 | | 10/2008 | Toussaint et al. | |
| 2008/0306628 A1 | * | 12/2008 | Ng-Thow-Hing et al. | 700/245 |
| 2009/0019410 A1 | * | 1/2009 | Yoshizawa | 716/9 |
| 2010/0049364 A1 | * | 2/2010 | Landry et al. | 700/245 |
| 2010/0114338 A1 | * | 5/2010 | Bandyopadhyay et al. | 700/36 |

FOREIGN PATENT DOCUMENTS

| | | |
|---|---|---|
| DE | 39 25 275 A1 | 2/1991 |
| DE | 198 00 552 C2 | 4/1999 |
| DE | 102 00 534 A1 | 7/2003 |
| DE | 10 2008 057 142 A1 | 11/2009 |

* cited by examiner

*Primary Examiner* — Calvin Cheung
*Assistant Examiner* — Martin Weeks

(57) ABSTRACT

A method for operating a multi-axis, preferably six-axis, robot with axes that can be driven by drive means is proposed. The axes are possible to be moved separately and their movement is controlled by a control facility. Before the movement of the robot is executed, a control data record is created for controlling the movement of the robot as a function of initial and target information for the robot input by a user. The control facility performs a verification of the control data record in respect of at least one predefined basic condition relating to the operation of the robot stored in a memory. The control data record is adjusted based on the at least one basic condition while retaining the target information as a function of the result of the check.

9 Claims, 3 Drawing Sheets

METHOD FOR OPERATING A MULTI-AXIS ROBOT

CROSS REFERENCE TO RELATED APPLICATIONS

This application claims priority of German application No. 10 2010 008 240.6 filed Feb. 17, 2010, which is incorporated by reference herein in its entirety.

FIELD OF THE INVENTION

The invention relates to a method for operating a multi-axis, preferably six-axis, robot with axes that can be driven by way of drive means.

BACKGROUND OF THE INVENTION

Such methods are used for example for controlling robots (industrial robots) in medical examination rooms. These robots can perform different tasks, by way of for example the integration of a radiation emitter and a radiation receiver on a part of the robot of an X-ray angiography system. It is possible here for the robot to move away from or around an examination object based on various programmable paths, thereby allowing a very wide range of recordings to be obtained of the examination object.

It is normal to allow robots to operate in an isolated manner in a specific work cell, to which people are denied access. Such robots are programmed for time optimization, in other words speed and throughput, long working lives and repetition accuracy, in respect of their path planning algorithms.

However there are also instances in which people, e.g. a physician or patient, are present in the work cell. It is then frequently the case that people find the movements of the robot intrusive or threatening. Many people find the path planning algorithms of the robot unpredictable. Predefined acceleration profiles and resulting configuration changes in the robot system at high axial velocities also cause high levels of noise which people regularly find unpleasant or similarly threatening.

SUMMARY OF THE INVENTION

The problem underlying the present invention is therefore that of specifying a method for operating a robot, according to which a person finds the operation of the robot less threatening or intrusive.

According to the invention this problem is resolved by a method for operating a multi-axis, preferably six-axis, robot with axes that can be driven by way of drive means. It is possible to move the axes separately and their movement being controlled by way of a control facility, which before the movement of the robot is executed creates a control data record for controlling the movement of the robot as a function of initial and target information for the robot input by a user. The control facility performs a verification of the control data record in respect of at least one predefined basic condition relating to the operation of the robot stored in a memory and the control data record is adjusted based on the at least one basic condition whilst retaining the target information as a function of the result of the check.

It is thus possible with the inventive method to exclude movements of the robot that people find loud, unpredictable and threatening, which are essentially defined in the control data record created by the control facility by verifying or synchronizing the control data record based on or with at least one predefined basic condition stored in a memory. According to the invention this is ensured in so far as the control data record is adjusted based on the at least one basic condition whilst retaining the target information as a function of the result of the check.

This means that in the event of an exemplary movement of the robot based on a control data record created by the control facility, which contains a movement in the form of at least one parameter required for the operation of the robot, which infringes a basic condition relating to the operation of the robot, said movement of the robot is either not executed or is executed having been modified in such a manner that the basic condition is complied with. In other words the control data record is influenced by way of the control facility or a new control data record is created which no longer violates the one or more basic conditions.

It is of course also possible to define the basic conditions in such a manner that a movement of the robot only takes place if the basic condition is met by the control data record on which the movement of the robot is based. In other words the opposite approach to the approach described above but having the same effect from the outside.

The basic conditions of operation of the robot can vary. They include for example complete movement paths (trajectories) of the robot, individual movements of certain segments of the robot and also permanently installed objects present in the room. The basic conditions can also be rotation angles, speeds, rotational velocities of individual or a number of axes or predefined distance values which are to be complied with for certain part movements. The basic conditions can also relate to information about the noise resulting from individual or several movements of the robot.

In other words for a defined control data record created by the control facility based on the initial and target information given by a user, a basic condition is not satisfied by the control data record for example if it might be associated with a collision with a fixed object, such as an examination table for example.

It is also possible for the movement of individual or several components of the robot that people find noisy because of high speeds or a large rotation angle as described above, as result for example from the previously stored acceleration profiles, to be controlled correspondingly by way of a basic condition in the form of a speed limit. After the control data record has been adjusted the robot will only execute the corresponding movement at reduced speed or with a smaller rotation angle in a modified trajectory, which is reflected in a lower level of noise. A control data record can also infringe a basic condition if a movement path defined by it passes very close to an examination object, such as a patient for example, since patients frequently find such movements threatening. Conversely a basic condition would be met if the control facility and therefore the control data record take into account a certain distance between the robot during its movement and the examination object.

Generally speaking the basic conditions comprise stored parameters relating to the operation of the robot, which in certain operating situations can be felt by people to be very noisy and/or otherwise as threatening. However these can be adjusted, in other words modified or circumvented, by the control facility as a function of the result of the check on the control data record on which the operation of the robot is based.

For example instead of a rapid straight movement originally created by the control facility according to a first original control data record, after adjustment of said control data record a robot can move through a curve at a slow speed, with the result that less noise is produced and a region of an examination object is circumnavigated at a distance. Naturally despite the adjustment of the control data record, as mentioned above, the target information input by the user is retained.

There is no limit with regard to the number of basic conditions stored in the memory.

A basic condition is preferably a path-type movement curve and/or the movement velocity and/or the rotation angle or rotational velocity of an axis or a drive means of the robot. Such parameters, which are essential for the operation of the robot, frequently result in operation of the robot that people find intrusive or threatening, for example in respect of the associated noise levels.

It is particularly expedient if the control facility, in particular an algorithm, executes a real-time simulation before the robot moves to verify the original and/or adjusted control data record of the movement of the robot. The simulation allows verification of the control data record in respect of the at least one basic condition without time loss and produces a corresponding check result as a function of which the control data record is adjusted. Optionally a further real-time simulation with the adjusted control data record can be performed for verification purposes before the "changed" robot movement is executed.

An algorithm that performs the verification and adjustment is preferably stored in the control facility. It is particularly preferable here if the algorithm consists of a number of components, so that individual parameters, such as acceleration values of the individual axes of the robot for example, can be read out and adjusted by way of a suitable interface of the control facility.

As part of the adjustment it is possible to perform an adjustment of the acceleration profiles of the robot and/or to implement a filter function to avoid abrupt direction or acceleration changes and abrupt braking processes. The adjustment of the acceleration profiles serves for example to optimize the velocities of the robot, advantageously allowing the noise levels resulting from high speeds of the robot to be reduced. The filter function preferably operates in such a manner that all abrupt movements of the robot are modified so that people no longer find them surprising and unpredictable.

It is expedient if the memory is configured as an external database communicating with the control facility. It is thus possible to store the knowledge about the at least one basic condition, e.g. the acceleration values of the respectively used robot type, so that it is available to the control facility and the algorithm stored there. Also a number of control facilities of different robots can access the database.

The invention also relates to a multi-axis, preferably six-axis, robot with an assigned control facility configured to implement the method described above.

BRIEF DESCRIPTION OF THE DRAWINGS

Further advantages, features and details of the invention will emerge from the exemplary embodiment described below and based on the drawings, in which.

DETAILED DESCRIPTION OF THE INVENTION

Figure 2:
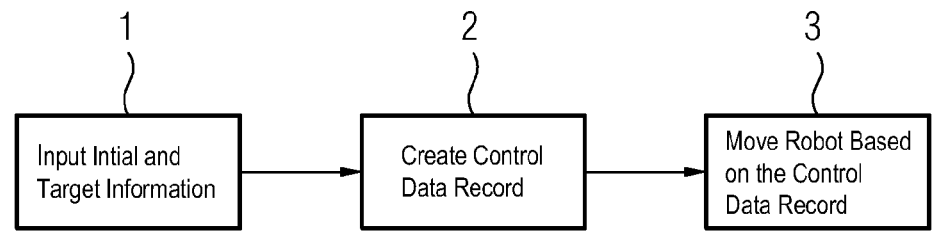
FIG. 2 shows a schematic sequence of the method for operating a robot known from the prior art.

FIG. 2 shows a schematic sequence of the method known from the prior art for operating a multi-axis robot with axes that can be actuated separately by way of a control facility 2. A user inputs at least target information, if the initial information is known, or optionally initial and target information for the robot into an input facility 1. The information is forwarded by the input facility 1 to the control facility 2. This calculates or creates a control data record for controlling the movement of the robot before the robot actually moves. The movement describes a certain path-type movement curve (trajectory) along which the robot moves as a result of the operation of one or more of its axes. The control facility 2 enables movement of the robot based on the control data record, as shown by the box 3.

The control data record created by the control facility 2 is set up here principally for time optimization, in other words high acceleration velocity in particular, so that high noise levels result, in particular due to high speeds of the mechanical drives of the robot or its axes, and people regularly find such noise levels intrusive. Also people may find the movements contained in the control data record unpredictable.

Figure 1:
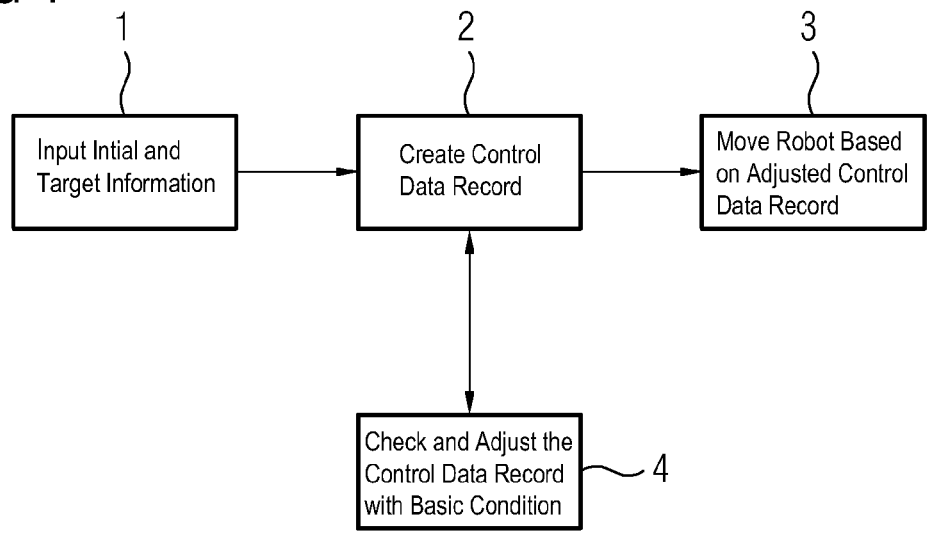
FIG. 1 shows a schematic sequence of the inventive method for operating a robot.

This is where the inventive method comes into play, as described in FIG. 1. Here too a user uses an input facility 1 to input certain target information or optionally initial and target information, which is then forwarded to the control facility 2, which uses it to create a control data record. This control data record contains a path-type movement curve, along which the robot would move when executing its movement. The control data record contains all the parameters required for execution of the movement of the robot. These include in particular individual movements to be executed by certain axes in particular with regard to their angulation or axial velocity. The control data record therefore describes which axes move in which direction and how quickly.

Before the movement is executed according to the invention there is preferably a real-time simulation of the movement using an algorithm stored in the control facility 2, said simulation being used to verify the control data record created by the control facility 2 in respect of one or more predefined basic conditions stored in a memory 4 and relating to operation, in other words the movements to be executed by the robot. The memory 4 here is configured as an external database communicating with the control facility 2.

If for example the planned path curve of the robot contained in the control data record passes too close to an object, such as a person, who might find this threatening, the check result created after verification and synchronization of the control data record with the basic conditions stored in the memory 4 contains an infringement of the exemplary basic condition of compliance with a minimum distance from objects present in the room. The control data record is modified based on the check result so that this infringement is circumvented and according to the example the originally planned path curve contained in the control data record now complies with a larger distance from the object. The target information is retained in this process, in other words the robot reaches the target location defined in the target information as input by the user by way of the input facility 1.

A basic condition can also be a rotation angle of an axis or a drive means or motor. Infringement of the basic condition stored in the memory 4 would therefore also be present, if the control data record were to provide for the movement of an axis with a large rotation angle, which would produce a high noise level. Based on the check result the movement of the corresponding axes or corresponding drive means is executed with a slower rotation and/or a smaller rotation angle due to a modified path curve and a reduced sound level as a result; in other words the control data record on which the originally planned movement is based is also adjusted or changed. It is possible to adjust or change certain acceleration profiles of the robot in this manner.

A filter function can also be implemented in the control facility 2, to filter abrupt direction or acceleration changes and abrupt braking processes of the robot, which people frequently find threatening, as part of the verification or adjustment of the original control data record. Corresponding movements are deleted from the control data record or are replaced by less abrupt movement or braking processes.

After adjustment of the original control data record there is preferably a new real-time simulation of the movement of the robot on which the changed or adjusted control data record is now based by the control facility 2 or the algorithm stored therein before the actual movement starts (box 3).

Figure 3:
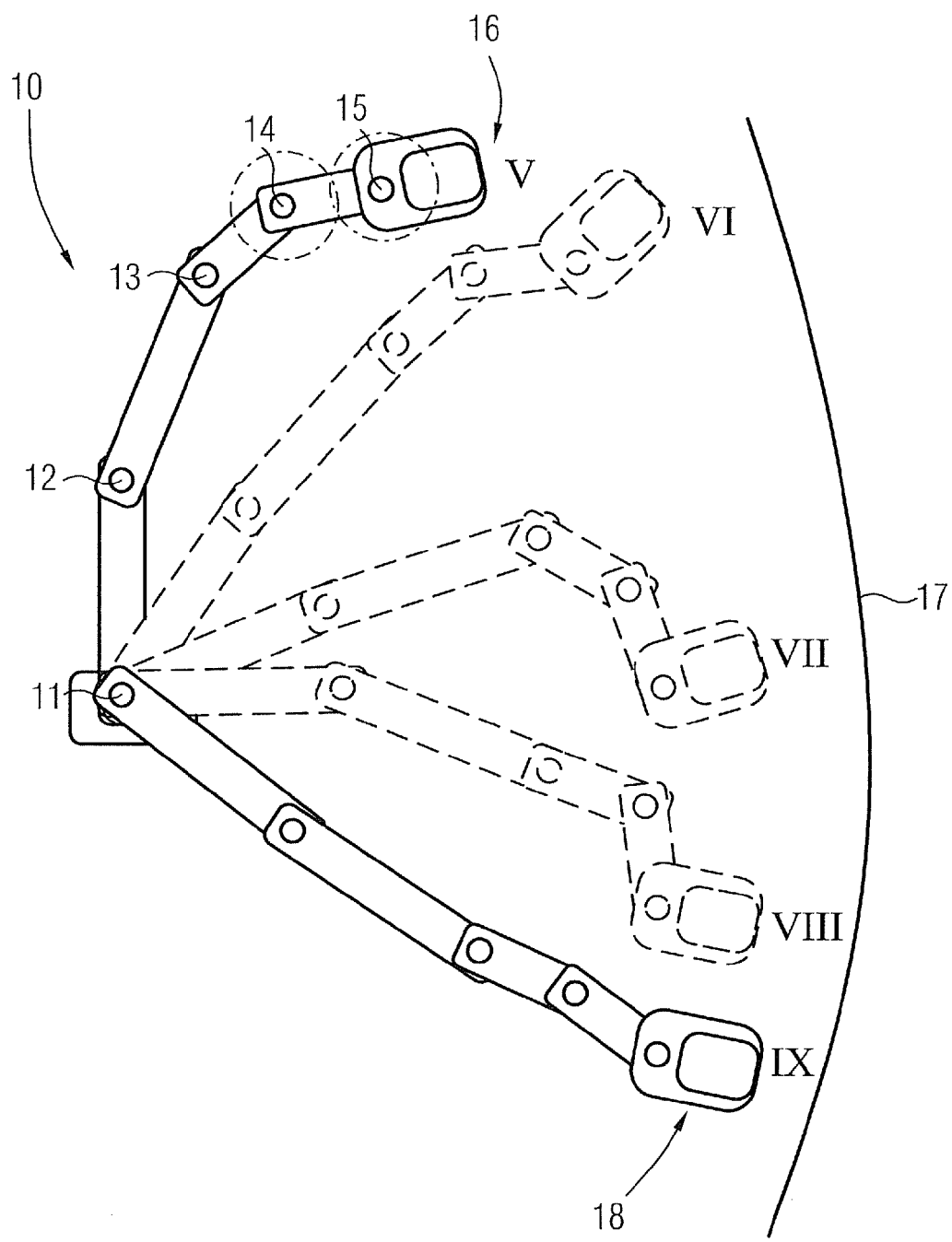
FIG. 3 shows an exemplary robot movement according to the prior art.

FIG. 3 shows an exemplary robot movement according to the prior art. A robot 10 that can be moved by way of the five axes 11, 12, 13, 14, 15 with assigned control facility 2 (see FIG. 2) is to be moved from its initial configuration 16 (position V) around the object 17, which can be a person or object, into the target configuration 18 (position IX) according to the target information predefined by a user. According to the user input the control facility 2 (see FIG. 2) creates a control data record, which provides for the movement of the robot 10 essentially being executed by way of the axes 11, 14 and 15. In the manner of the created control data record the control facility 2 initiates a corresponding movement of the robot 10 from its initial configuration 16 into the target configuration 18 along the positions V, VI, VII, VIII, IX according to the target information, the positions VI, VII, VIII being shown with a broken line to clarify the movement of the robot 10, according to the diagram in FIG. 2. The operation or movement of the robot 10 and therefore the control data records created by the control facility 2 are designed for time optimization, so in principle provide for high axial velocities and angulations. Intrusive noise levels, e.g. in this instance due to the axes 14 and 15, are not taken into account.

Figure 4:
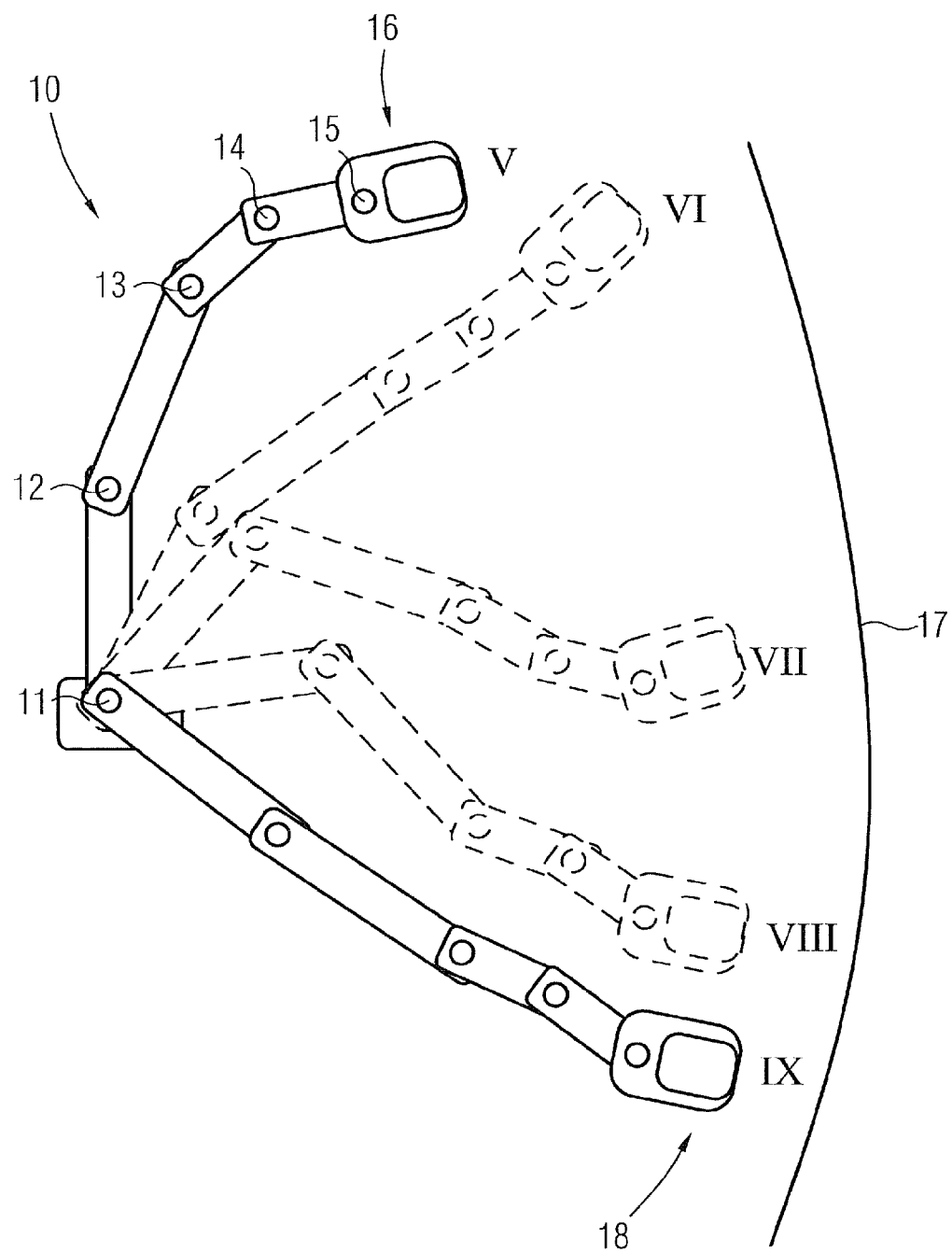
FIG. 4 shows an exemplary robot movement according to an embodiment of the invention.

In contrast FIG. 4 shows a robot movement of the robot 10, which is performed based on a control data record modified by the control facility 2 (see FIG. 1), in other words after verification and synchronization of the original control data record with the basic conditions stored in the memory 4 (see FIG. 1) in respect of the operation of the robot 10. From the verification of the original control data record with the basic conditions stored in the memory 4 the control facility 2 recognizes that a movement of the robot 10 executed as originally planned would produce intrusive noise due to the high angulation and axial velocities of the axes 14 and 15. The movement of the robot 10 is thus modified so that it takes place from the initial configuration 16 (position V) by way of other axes, here essentially the axes 11 and 12, with the target and target configuration 18 (position IX) remaining the same. The control facility 2 therefore uses the check result to calculate an alternative path-type movement curve (trajectory) taking into account the initial and target configurations 16, 18 of the robot 10, the movement of the robot 10 based on the modified control data record or the accordingly modified movement curve being one that people find gentler and in some instances less threatening or more predictable due to the lower axial velocities. See also the positions VI, VII, VII describing the movement differently compared with FIG. 3.

The same applies to the abrupt movements of the robot 10 described above, which as part of the adjustment of the control data record are deleted from said control data record by means of a filter or filter function or modified in this respect.

The invention claimed is:

1. A method for operating a multi-axis robot with axes being possible to be moved separately by a drive device, comprising:
   receiving input of an initial configuration and a target configuration of the robot from a user;
   creating a control data record for defining a movement of the robot by a computerized control device as a function of the initial configuration and the target configuration before moving the robot;
   storing a basic condition relating to an operation of the robot in a memory, the basic condition comprising a movement path of the robot, individual movements of segments of the robot, a fixed object installed in an examination room, a rotation angle and speed of the robot, distance between the robot and an examination object, and noise resulting from individual or several movements of the robot;
   checking the control data record with the basic condition;
   adjusting the control data record if the control data record infringes the basic condition so that the basic condition is met by the control data record; and
   moving the robot to the target configuration based on an adjusted control data record,
   wherein infringement of the basic condition comprises:
      the movement of the robot defined in the data record that is associated with a collision with the fixed object,
      a rotation angle and speed of the movement of the robot defined in the data record that are lamer than the rotation angle and speed stored in the basic condition,
      the movement of the robot defined in the data record that is closer than the distance between the robot and the examination object stored in the basic condition, and
      noise resulting from the rotation angle and speed of the movement of the robot defined in the data record that is higher than the noise stored in the basic condition, and
   wherein the rotation angle and speed of the movement of the robot defined in the data record is reduced in the adjusted control data record to meet the basic condition.

2. The method as claimed in claim 1, wherein the control device executes a real-time simulation before the robot moves to verify the original configuration and/or the adjusted control data record of the movement of the robot.

3. The method as claimed in claim 1, wherein an algorithm that performs the verification and the adjustment is stored in the control device.

4. The method as claimed in claim 1, wherein an acceleration profile of the robot is adjusted to avoid abrupt direction or acceleration changes and abrupt braking process.

5. The method as claimed in claim 1, wherein an acceleration profile of the robot is filtered to avoid abrupt direction or acceleration changes and abrupt braking process.

6. The method as claimed in claim 1, wherein the memory is an external database and is communicated with the control device.

7. A multi-axis robot, comprising:
   an input device that receives input of an initial configuration and a target configuration of the robot from a user;
   a memory that stores a basic condition relating to an operation of the robot, the basic condition comprising a movement path of the robot, individual movements of segments of the robot, a fixed object installed in an examination room, a rotation angle and speed of the robot, distance between the robot and an examination object, and noise resulting from individual or several movements of the robot;

a control device that is configured to:
- create a control data record for defining a movement of the robot as a function of the initial configuration and the target configuration before moving the robot,
- check the control data record with the basic condition, and
- adjust the control data record if the control data record infringes the basic condition so that the basic condition is met by the control data record; and a drive device that moves the robot to the target configuration based on an adjusted control data record, wherein infringement of the basic condition comprises:
- the movement of the robot defined in the data record that is associated with a collision with the fixed object,
- a rotation angle and speed of the movement of the robot defined in the data record that are lamer than the rotation angle and speed stored in the basic condition,
- the movement of the robot defined in the data record that is closer than the distance between the robot and the examination object stored in the basic condition, and
- noise resulting from the rotation angle and speed of the movement of the robot defined in the data record that is higher than the noise stored in the basic condition, and wherein the rotation angle and speed of the movement of the robot defined in the data record is reduced in the adjusted control data record to meet the basic condition.

8. The multi-axis robot as claimed in claim 7, wherein the drive device is configured to move axes of the robot separately.

9. The multi-axis robot as claimed in claim 7, wherein the robot comprises six axes.

\* \* \* \* \*